United States Patent [19]

Radford et al.

[11] Patent Number: 4,566,989
[45] Date of Patent: Jan. 28, 1986

[54] BURNABLE NEUTRON ABSORBERS

[75] Inventors: Kenneth C. Radford, Churchill; William G. Carlson, Murrysville, both of Pa.

[73] Assignee: Westinghouse Electric Corp., Pittsburgh, Pa.

[21] Appl. No.: 352,731

[22] Filed: Feb. 26, 1982

[51] Int. Cl.$^4$ .................... G21C 7/04; G21C 21/18
[52] U.S. Cl. .................... 252/478; 264/122; 264/125; 376/339
[58] Field of Search .............. 264/13, 60, 63, 66, 264/67, 115, 122, 125, 0.5; 376/339; 419/14, 17, 19, 32, 36, 40, 42, 65, 68; 106/286.5; 252/478

[56] References Cited

U.S. PATENT DOCUMENTS

| | | | |
|---|---|---|---|
| 2,727,996 | 12/1955 | Rockwell, III et al. | 376/458 |
| 3,088,898 | 5/1963 | Busby et al. | 376/339 |
| 3,121,128 | 2/1964 | O'Leary et al. | 264/63 |
| 3,234,104 | 2/1966 | Gale et al. | 376/327 |
| 3,243,349 | 3/1966 | Goeddel | 376/327 |
| 3,245,782 | 4/1966 | Ray | 376/339 |
| 3,255,092 | 6/1966 | Dee, Jr. | 376/333 |
| 3,320,176 | 5/1967 | Davis | 264/0.5 |
| 3,325,363 | 6/1967 | Goeddel et al. | 376/410 |
| 3,361,857 | 1/1968 | Rose | 264/0.5 |
| 3,372,213 | 3/1968 | Nisbiyama et al. | 264/0.5 |
| 3,540,894 | 11/1970 | McIntosh | 264/61 |
| 3,565,762 | 2/1971 | Nickel | 376/338 |
| 3,759,786 | 9/1973 | Abate-Daga et al. | 264/0.5 |
| 3,796,564 | 3/1974 | Taylor et al. | 419/60 |
| 3,884,839 | 5/1975 | Bon et al. | 376/288 |
| 3,912,798 | 10/1975 | Rachor et al. | 264/0.5 |
| 3,953,286 | 4/1976 | Watson et al. | 264/0.5 |
| 4,025,388 | 5/1977 | Jackson | 376/339 |
| 4,304,631 | 12/1981 | Walton et al. | 376/327 |

OTHER PUBLICATIONS

Lenel, Fritz V., *Powder Metallurgy*, Metal Powder Industries Federation, N.J., 1980, pp. 387-389.

*Primary Examiner*—Deborah L. Kyle
*Assistant Examiner*—Richard W. Wendtland
*Attorney, Agent, or Firm*—D. E. Erickson

[57] ABSTRACT

A neutron-absorber body for use in burnable poison rods in a nuclear reactor. The body is composed of a matrix of $Al_2O_3$ containing $B_4C$, the neutron absorber. Areas of high density polycrystalline $Al_2O_3$ particles are predominantly encircled by pores in some of which there are $B_4C$ particles. This body is produced by initially spray drying a slurry of $Al_2O_3$ powder to which a binder has been added. The powder of agglomerated spheres of the $Al_2O_3$ with the binder are dry mixed with $B_4C$ powder. The mixed powder is formed into a green body by isostatic pressure and the green body is sintered. The sintered body is processed to form the neutron-absorber body. In this case the $B_4C$ particles are separate from the spheres resulting from the spray drying instead of being embedded in the sphere.

8 Claims, 3 Drawing Figures

BURNABLE NEUTRON ABSORBERS

REFERENCE TO RELATED APPLICATIONS

This application relates to an application Ser. No. 352,686, filed concurrently herewith to Kenneth C. Radford and W. George Carlson for Burnable Neutron Absorbers, assigned to Westinghouse Electric Corporation (herein referred to as Radford Application). Radford application and applications Ser. No. 334,720 filed Dec. 28, 1981 to Kenneth C. Radford for "Neutron Absorber Pellets with Modified Microstructure" and Ser. No. 915,691 filed June 15, 1978 to W. L. Orr et al. for "Low Reactivity, Penalty Burnable Poison Rods" are incorporated below by reference.

BACKGROUND OF THE INVENTION

This invention relates to the art of nuclear reactors and it has particular relationship to burnable neutron-absorber assemblies, also called burnable-poison assemblies, for nuclear reactors. The burnable neutron-absorber assemblies with which this invention concerns itself are of the type described in Radford application. Such neutron-absorber assemblies include annular ceramic pellets which are stacked in tubes inserted in the core of a reactor. It is with the pellets that this invention concerns itself. Such a pellet includes a matrix of a refractory material which may include aluminum oxide ($Al_2O_3$) or zirconium oxide $ZrO_2$ or a combination of the two. A neutron absorber or neutron-capture component is distributed throughout this matrix. The neutron absorber may include one or more elements or compounds of the metals boron, gadolinium, samarium, cadmium, europium, hafnium, dysprosium and indium. A neutron absorber commonly used is boron carbide ($B_4C$) either natural or with the boron enriched $B^{10}$.

In the interest of brevity and concreteness to facilitate the understanding of those skilled in the art in the practice of this invention, this application will deal specifically with a matrix of $Al_2O_3$ and a neutron absorber of $B_4C$. It is understood that to the extent that this invention is practiced with other materials, such practice is within the scope of equivalents of this invention as scope of equivalents is defined and described in the Supreme Court Grover case cited in Radford application.

The method of producing pellets disclosed in Radford application and the pellets produced thereby have proven themselves highly satisfactory. However, experience with this method and the pellets produced thereby had led to the conclusion that several improvements are desirable. It is desirable that the pores or voids in the matrix be more efficiently or effectively used to take up the expansion of the $B_4C$ and absorb the helium gas generated by the neutron-boron reaction. It is also desirable that the strength, particularly the compressive strength, of the matrix be improved. It is an object of this invention to provide a method for producing neutron-absorbing bodies or ceramics having the above-described desirable properties. It is also an object of this invention to provide a neutron-absorbing body or ceramic having the above desirable properties.

In this application the expression "neutron-absorber assembly" or "poison assembly" means the neutron-absorber structure or rod as a whole including the pellets and the container in which the pellets are stacked; "neutron absorber" means the neutron-capture component, e.g., $B_4C$; "neutron-absorber body" means the body including the neutron absorber in its matrix.

SUMMARY OF THE INVENTION

In the practice of the invention of the Radford application a slurry of a mixture of $Al_2O_3$ and $B_4C$ powder are spray dried. The resulting dried powder consists of agglomerated spheres of $Al_2O_3$ in which $B_4C$ particles are embedded. This powder is then pressed into pellets and sintered. It has been realized in arriving at this invention that the neutron-absorbing effectiveness and the resistance to swelling of the ceramic or neutron-absorber bodies can be improved and at the same time the strength of the ceramic bodies can be increased by separating the $Al_2O_3$ and the $B_4C$ in the production of the ceramic bodies.

In the practice of this invention a slurry of the $Al_2O_3$ alone is produced. A hard binder, typically polyvinyl alcohol, is added and the slurry and binder are spray dried. The product of the spray drying is a powder of agglomerated $Al_2O_3$ spheres 30 to 50 microns in mean diameter. This powder is mixed with dry $B_4C$ powder 5 to 15 microns in mean size forming a homogeneous mixture. This mixture is pressed isostatically into green tubes which are then sintered. When the mixture is pressed the agglomerates of $Al_2O_3$ deform and lock together trapping the $B_4C$ particles in the pores. During sintering, the binder volatilizes and the structure of the resulting ceramic has nearly spherical high-density regions of $Al_2O_3$. These regions are predominantly surrounded by pores and by $B_4C$ particles.

The practice of this invention results in a preferred location in the $Al_2O_3$ matrix of the $B_4C$ particles and the pores. The matrix of the $Al_2O_3$ consists microscopically of high-density polycrystalline regions and its strength is higher than for the matrix produced in the practice of the invention of Radford application. Since the $Al_2O_3$ is dried, the hygroscopic tendency of the matrix is materially reduced. The $B_4C$ particles are predominantly in the pores of the matrix. The available porosity accommodates the swelling of the $B_4C$ particles when bombarded by neutrons and the resulting helium gas.

BRIEF DESCRIPTION OF THE DRAWING

For a better understanding of this invention, both as to its organization and as to its method of operation, together with additional objects and advantages thereof, reference is made to the following description taken in connection with the accompanying drawings, in which.

DETAILED DESCRIPTION OF THE INVENTION

In the first step 11 of the process of this invention a powder of $Al_2O_3$ is milled in a ball mill in a liquid, typically water which may be deionized. Small but effective quantities of a wetting agent, a surfactant and a defloculant are added to the water and $Al_2O_3$. The mean size of the $Al_2O_3$ is 10 to 30 microns. The relative quantities of the $Al_2O_3$, the water and the other components are substantially the same as disclosed in the Radford application. The result of the milling is a slurry containing about 40% $Al_2O_3$ only.

In the second step 13 a hard binder, such as polyvinyl alcohol, is added to the slurry. In the third step 15 the slurry is spray dried in apparatus as disclosed in Radford application. The spray drying results in spheres of agglomerated particles of $Al_2O_3$ having a mean diameter of about 30 to 50 microns. In the fourth step 17 this powder is screened to eliminate excessively large agglomerates. In the next step 19 a homogeneous mixture of the $Al_2O_3$ agglomerates and $B_4C$ powder is produced. The content of the $B_4C$ powder in this mixture in weight percent may be between 1 and 50. The mean size of the $B_4C$ particles is between 5 and 15 microns.

The remaining steps 21 to 31 are the same as the corresponding steps of Radford application. The homogeneous mixture is poured into a mold, step 21. A green cylinder or green mass is formed by compressing the powder in the mold by isostatic pressure, step 23. Optionally the green cylinder may be presintered, step 25. The mass is sintered to size, step 27. The sintering is in an atmosphere of argon at about atmospheric pressure and the sintering temperature is between 1400° C. and 1800° C. The outer surface of the sintered body is ground, step 29. Ceramic neutron-absorber pellets of $B_4C$ in a matrix of $Al_2O_3$ are cut from the cylinder.

Figure 1:
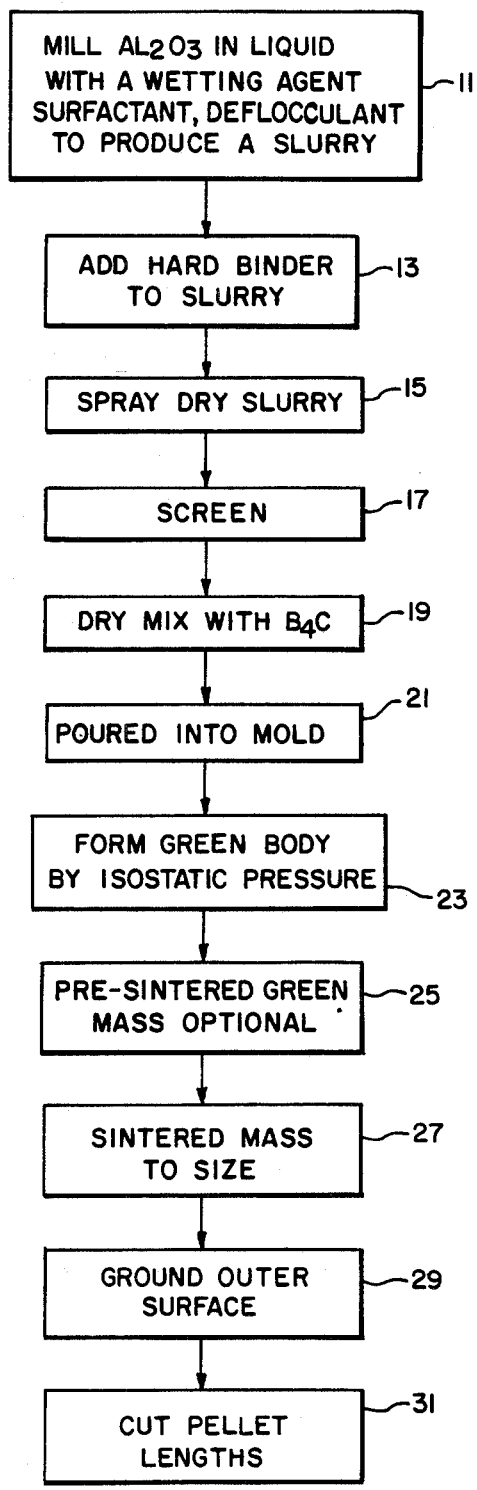
FIG. 1 is a flow chart illustrating the practice of this invention.
Figure 2:
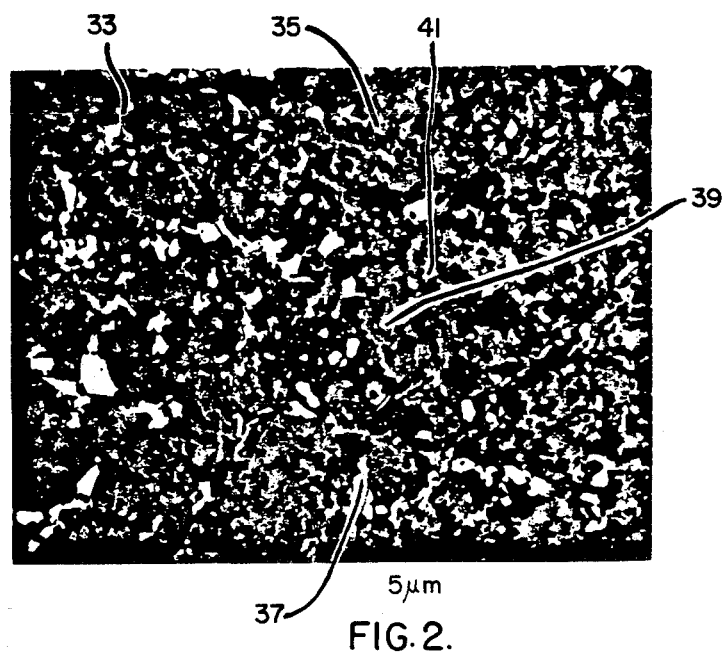
FIG. 2 is a photomicrograph of a ceramic or neutron-absorber body produced in the practice of this invention.

The microstructure of a ceramic body produced in the practice of this invention is shown in FIG. 2. As indicated a length of about 1/16 inch on the photomicrograph corresponds to 5 microns. The black areas 33 on the photomicrograph are reproductions of the pores, the dark-gray areas 35 of the $B_4C$. The regions of $Al_2O_3$ alone are interlocked as appears at 39. The $B_4C$ regions are in pores surrounding the $Al_2O_3$ as appears at 41.

Figure 3:
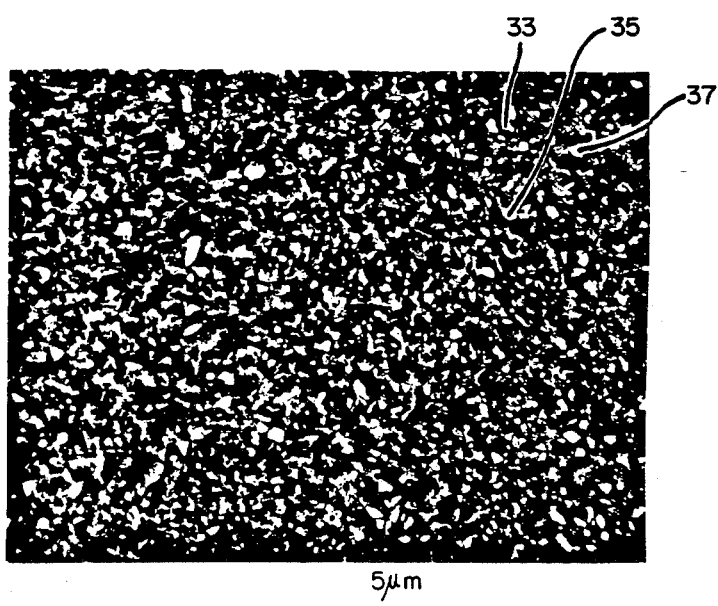
FIG. 3 is a photomicrograph of a ceramic body produced in the practice of the invention of Radford application presented for comparison purposes.

The photomicrograph shown in FIG. 3 is illustrative of the practice prior to this invention and is presented for comparison purposes. This photomicrograph also shows black areas 33 corresponding to pores, dark-gray areas 35 corresponding to $Al_2O_3$ and light-gray areas 37 corresponding to $B_4C$. But the interlocked regions of $Al_2O_3$ alone are absent. Nor is the $B_4C$ in pores encircling the $Al_2O_3$. The $B_4C$ as shown in FIG. 3 intermingles with the $Al_2O_3$.

While preferred practice and a preferred embodiment of this invention are disclosed herein, many modifications thereof are feasible. This invention is not to be restricted except insofar as is necessitated by the spirit of the prior art.

We claim:

1. The method of making burnable neutron-absorber bodies for the burnable-poison assemblies of a nuclear reactor which comprises:
   (a) producing a slurry of a powder of a refractory material including one or more of the class consisting of $Al_2O_3$ and $ZrO_2$;
   (b) adding a binder to said slurry;
   (c) drying said slurry to produce a powder of agglomerated particles of one or more of the class of $Al_2O_3$ and $ZrO_2$ including said binder;
   (d) mixing said powder with a powder of the class of neutron-absorbers consisting of elements or compounds of boron, gadolinium, samarium, cadmium, europium, hafnium, dysprosium and indium, to form a mixture of said powders;
   (e) isostatically compressing said mixture to form a green body;
   (f) sintering said green body to form a sintered body; and
   (g) forming said sintered body into a neutron-absorber body of appropriate shape and dimensions.

2. The method of claim 1 wherein the mean size of the aluminum oxide powder in the slurry is about 10 to 20 microns and the mean size of the powder of the neutron absorber is about 5 to 15 microns.

3. The method of claim 1 wherein the slurry is spray dried producing aluminum oxide spheres of 30 to 50 microns mean diameter.

4. The method of claim 1 wherein the neutron absorber in the mixture of powders is boron carbide ($B_4C$) and the content of the $B_4C$ in the mixture in weight percent is about 1 to 50.

5. The method of claim 1 wherein the green body is sintered in an atmosphere of argon at about atmospheric pressure at a temperature of between 1400° C. and 1800° C.

6. The method of claim 1 wherein the binder is a hard binder.

7. A burnable neutron-absorber body for use in the burnable-poison assemblies of a nuclear reactor, said body being formed of a porous matrix of $Al_2O_3$, said matrix including high-density polycrystalline particles of $Al_2O_3$ juxtaposed to pores in which pores there are particles of $B_4C$.

8. The body of claim 7 wherein the pores substantially encircle the $Al_2O_3$ particles, said encircling pores partially or wholly containing particles of $B_4C$.

* * * * *